United States Patent [19]

Bertin

[11] 4,323,254
[45] Apr. 6, 1982

[54] SEALS OF THE TYPE DESIGNED TO ENSURE FLUID-TIGHTNESS BETWEEN TWO RINGS OF CONICAL BEARINGS

[75] Inventor: Jacques Bertin, Asnieres, France

[73] Assignee: Hutchinson-Mapa, Paris, France

[21] Appl. No.: 140,143

[22] Filed: Apr. 14, 1980

[30] Foreign Application Priority Data

Apr. 12, 1979 [FR] France ................... 79 09377

[51] Int. Cl.³ ............................................... F16J 15/34
[52] U.S. Cl. ..................................................... 277/40
[58] Field of Search ..................................... 277/38–43, 277/36

[56] References Cited

U.S. PATENT DOCUMENTS 3,127,183 3/1964 Talamonti ........................ 277/40

FOREIGN PATENT DOCUMENTS 529871 7/1954 Belgium ........................ 277/40

Primary Examiner—Robert I. Smith
Attorney, Agent, or Firm—Larson and Taylor

[57] ABSTRACT

The seal is designed to ensure fluid-tightness between the cone and the cup of a conical roller bearing. The seal includes an armature, having a frustoconic bearing surface, fastenable with the cone, a collar stop mounted slidably along the armature and fast to a second bearing surface, and an annular spring mounted in extension on the first bearing surface and supported against the second bearing surface so as to urge these two bearing surfaces constantly into relative axial separation and to be rollable or slidable on the first bearing surface when the collar stop is moved axially with respect to the armature.

8 Claims, 4 Drawing Figures

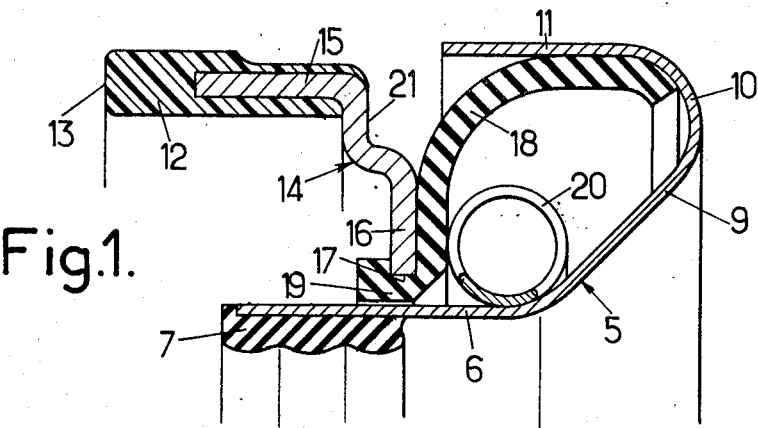
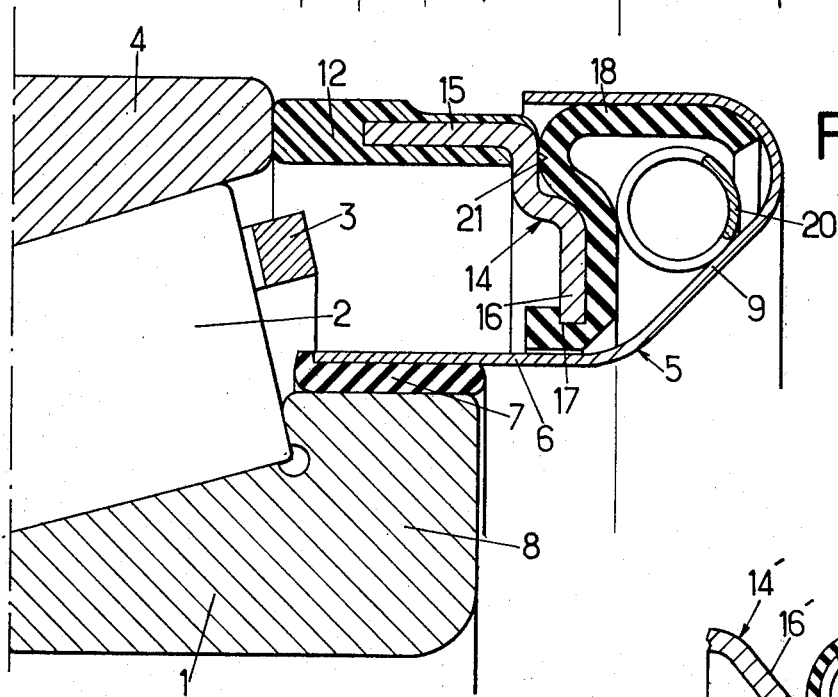
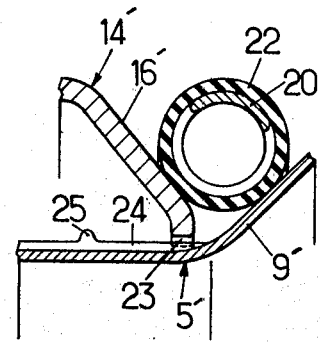
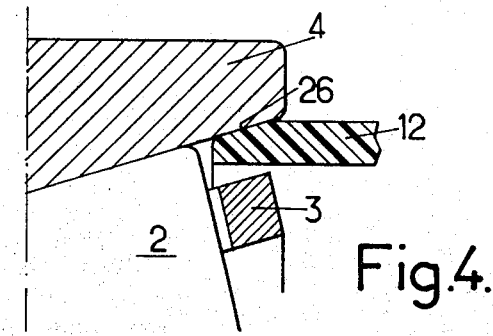

SEALS OF THE TYPE DESIGNED TO ENSURE FLUID-TIGHTNESS BETWEEN TWO RINGS OF CONICAL BEARINGS

BACKGROUND OF THE INVENTION

Field of the Invention

The invention relates to seals designed to ensure the fluid-tightness between the inner ring or "cone" of a conical roller bearing and the outer ring or "cup" of this bearing, as well as to similar seals, that is to say designed to ensure fluid-tightness between two coaxial members of which one is rotatable with respect to the other around the common axis of the two members and whose relative axial positions are not determined with exactitude in advance.

It relates more particularly, among these seals, to those which comprise two coaxial annular elements, namely a first annular element fast to the first member and a second annular element mounted on the first element so as to be movable axially with respect to the latter, means for applying this second element axially against the second member and means for ensuring fluid-tightness between the two elements whatever their relative axial position.

It is a particular object of the invention to render seals of the type concerned such that they respond to the various exigencies of practice better than hitherto, notably in that their radial bulk is smaller and in that the force applying the second element against the second member remains substantially constant for a relatively wide range of distinct axial positions of this second element with respect to the first.

GENERAL DESCRIPTION OF THE INVENTION

To this end, there are provided according to the invention fluid-tight seals of the type concerned characterised essentially in that their means for applying the second element elastically against the second member comprise a frustoconic collar or bearing surface or the like fast to one of the two elements, another bearing surface fast to the other element, and an annular spring mounted with extension on the frustoconic bearing surface and supported axially against the other bearing surface so as to urge the two bearing surfaces constantly into relative axial separation and to be rollable or slidable on the frustoconic bearing surface by changing in diameter on relative axial movements of the two said bearing surfaces.

In preferred embodiments recourse may be had also to one and/or other of the following features:

The half-angle at the apex of the frustoconic conical surface or the like is comprised between 30° and 45°, the frustoconic bearing surface is constituted by an end widened into a trumpet mouth of a constituent cylindrical armature of the first element, the other bearing surface has the general shape of a transverse washer, the other bearing surface extends along a frustoconic surface or the like whose inclination to the axis is opposite that of the above frustoconic bearing surface, the second element is mounted on the first element through a flexible and fluid-tight annular diaphragm which is fixed in fluid-tight manner on respectively these two elements, the annular spring is a helicoidal tension spring wound in a ring, the spring according to the preceding paragraph is coated with a sheet of elastomeric material ensuring fluid-tightness between this spring and the two bearing surfaces against which it is applied, in a seal according to the preceding paragraph, the second element is mounted slidably with play along the first and the relative rotations of these two elements are prevented by the cooperation of at least one excentric stop fast to one of the two elements with one complementary bearing surface of the other.

The invention comprises, apart from these main features, certain other features which are preferably used at the same time and which will be more explicitly considered below.

In the following, preferred embodiments of the invention will be described with reference to the accompanying drawing given, of course, purely by way of nonlimiting example.

BRIEF DESCRIPTION OF THE DRAWING

FIGS. 1 and 2, of this drawing, show in axial half-section a fluid-tight seal constructed according to the invention, respectively in its free state and in its state mounted on a conical roller bearing.

FIGS. 3 and 4 show also in axial half-section two details of modifications of such a seal again according to the invention.

DESCRIPTION OF PREFERRED EMBODIMENTS

It is a matter here of ensuring fluid-tightness between on the one hand, the inner ring or cone 1 of a conical roller bearing 2 held by a cage 3 and on the other hand, the outer ring or cup 4 of this bearing.

In the embodiments illustrated in FIGS. 1 and 2, the seal adopted to ensure this fluid-tightness comprises:

a first annular rigid armature 5 comprising an inner cylindrical section or collar 6 adapted to be force fitted, with the interposition of an elastomeric jacket 7 overmolded inside this section, around an outer collar 8 of the cone 1, said section being joined successively, progressively and continuously, to a frustoconic section 9 flared like the mouth of a trumpet, then to a side 10 flanged outwardly along a section of a torus, and finally to an outer cylindrical section 11, an annular collar stop 12 having a flat bearing surface 13 adapted to be supported axially against a facing bearing surface of the cup 4, this collar stop being itself mounted on a second annular rigid armature 14 whose axial half-section is generally L-shaped, this second armature hence being composed of a bush 15 inserted axially in the collar stop 12 and a disk open in its center at 17, a flexible and fluid-tight elastic diaphragm 18, having a certain resistance to torsion, force fitted both on to the edge 17 of the opening of the disk 16, thereby forming a cushion 19 at this level which surrounds with slight play the cylindrical collar 6 of the first armature 5, and inside the cylindrical section 11, even of the toric side 10, so as to connect together at the same time the two armatures 5 and 14 in sealed manner and to guide their relative movements, and an annular spring 20 mounted gripped on the frustoconic bearing surface 9 supported axially against the disk 16, or more precisely against the diaphragm portion 18 covering this disk, so that this spring 20 pushes back the collar stop 12 constantly in an axial direction and so that the axial movements of this collar stop are translated by rolling or sliding of this spring against said bearing surface 9.

In the free state (FIG. 1), that is to say when the element 5 is not mounted on the cone 1, the spring 20 surrounds the cylindrical collar 6 at the end of smallest diameter of the frustoconic bearing surface 9, and the collar stop 12, with the armature 14 and the cushion 19, occurs in its axial position most separated from this bearing surface 9, that is to say furthest to the left in FIG. 1.

On the mounting of the element 5 on the cone 1, ensured by the axial movement of this element with respect to this cone towards the left in the drawing, with progressive squeezing of the intermediate jacket 7, the collar stop 12 comes into axial abutment against the facing area of the cup 4.

From this moment the end of the mounting is translated by a relative movement of this collar stop 12 towards the right in the drawings, which pushes back the spring 20 causing it to roll or slide on the frustoconic bearing surface 9 towards its areas of increasing diameters and against its return gripping force.

This force urges the collar stop 12 constantly and elastically against the cup 4, and with a force which remains substantially constant over a relatively wide range of different axial positions of this collar stop, that is to say independently of the wear of the rubbing parts and of the assembly tolerances between the cone and the cup, which tolerances may be translated by substantial differences between the relative axial positions of these two elements and by a fault in their parallelism.

This constancy of the force of elastic application of the collar stop 12 against the cup 4 constitutes an important advantage of the invention, since it enables the desired fluid-tightness to be ensured in any circumstances and good conditions, the frictional force between the collar stop 12 and the cup 4 never being excessive nor insufficient.

The movements of the collar stop 12 and of the spring 20 have also the effect of deforming the flexible diaphragm 18. To render possible a considerable deformation of this diaphragm while preserving a small radial bulk for the seal assembly, it is advantageous to provide in the armature 14 an annular recess 21 adapted to receive the middle annular zone of this diaphragm in its deformed state, as is seen in FIG. 2.

This recess has for example an L-shaped profile and is interposed between the bush 15 and the disk 16 of the armature 14 concerned, which confers on the axial half-section of the latter the general shape of a widely open W.

The collar stop 12 is constituted by or coated with a material having a low coefficient of friction and good wear resistance, which material may be a metal or alloy, or again a synthetic or elastomeric plastic material, possibly filled with metal, glass, or other substance.

The rigid armatures 5 and 14 are generally metallic; they could also be constituted by a plastic or synthetic material if necessary reinforced.

By the expression "fructoconic bearing surface or the like" qualifying the section 9, is meant a bearing surface which extends, either along a truncated cone, the half-angle at the apex of the latter than being generally comprised b7tween 30° and 45°, or along a surface of revolution whose generator, again inclined to the axis of the seal, is no longer rectilinear but curved, as is the case for the mouth of a trumpet.

In FIG. 3, is shown diagrammatically a modification according to which the diaphragm 18 is eliminated as well as the sections 10 and 11 of the preceding armature 5, fluid-tightness between this armature and the collar stop 12 then ensured at the level of the contacts between the annular spring and the two bearing surfaces against which the latter is supported, the spring being coated to this end with a sheath 22 of elastomeric material.

Here again is to be seen a first armature 5' ensleevable on the cone 1 and the second armature 14' fast to or constituent with the collar stop, but the relative angular and axial guidance between these two armatures is ensured here by cooperation of the notched edge 23 of the central opening formed in the armature 14' with a notched complementary coating 24 applied to the armature 5', an annular rib 25 of this coating preventing the mutual axial disengagement of the two armatures for the free state of the seal.

In this case both the bearing surfaces 9' and 16' against which the sheathed annular spring is supported are advantageously metallic and frustoconic, their respective inclinations to the axis of the seal being in opposite directions.

In FIG. 4 is shown diagrammatically a modification according to which the axial support of the collar stop 12 against the cup 4 of the bearing is effected along complementary surfaces 26 of these two elements which are frustoconic and no longer flat.

As a result of which, and whatever the embodiments adopted, there is finally provided a fluid-tight seal whose constitution, operation and advantages—notably constancy of the force of axial application between the frictional elements in relative movement and the smallness of the radial bulk—emerge sufficiently from the foregoing.

As is self-evident and as emerges already from the foregoing, the invention is in no way limited to those of its types of application and embodiments which have been more especially considered; it encompasses, on the contrary, all modifications, notably those wherein the seal concerned would be designed to equip not a conical roller bearing, but a cylindrical roller bearing, or more generally an assembly having two coaxial elements in mutual rotary movement whose relative axial positions are not defined with exactness and between which it is desired to ensure fluid-tightness.

I claim:

1. Seal for ensuring the fluid-tightness between first and second coaxial members one of which is rotatable with respect to the other around the common axis of the two members and whose relative axial positions are not determined with exactitude in advance, said seal comprising two coaxial annular elements, namely a first annular element fast to the first member and a second annular element mounted on the first element so as to be axially movable with respect to the latter, means for applying said second element axially against the second member and means for ensuring fluid-tightness between the two elements, whatever their relative axial position, said means for applying the second element against the second member comprising a frustoconic bearing surface or the like fast to one of the two elements, the half-angle at the apex of the frustoconic bearing surface of the like being between 30° and 45° with respect to the seal axis, another bearing surface fast to the other element, and an annular spring mounted with extension on the frustoconic bearing surface and supported axially against the other bearing surface so as to urge these two bearing surfaces constantly into relative axial separation and to be rollable or slidable on the frustoconic bearing surface by changing in diameter during the relative axial movements of the two said bearing surfaces, said first annular element comprising a cylindrical section adapted to be sealingly engaged around an outer collar of an inner ring of a conical roller bearing, and joined thereto, a frustoconic section flared outwardly like the mouth of a trumpet, said frustoconic bearing surface being a surface of said frustoconic section, and said second element being mounted so as to be slidable with play along the cylindrical section of the first element.

2. Fluid-tight seal according to claim 1, wherein the other bearing surface has the general shape of a transverse washer.

3. Fluid-tight seal according to claim 1, wherein said other bearing surface extends along a frustoconic surface or the like whose inclination to the axis is opposite that of the above frustoconic bearing surface.

4. Fluid-tight seal according to claim 1, wherein said second element is mounted on said first element through a flexible and fluid-tight annular diaphragm which is fixed in fluid-tight manner on these two elements respectively.

5. Fluid-tight seal according to claim 1, wherein the annular spring is a helical spring under tension coiled in a ring.

6. Fluid-tight seal according to claim 5, wherein said spring is coated with a sheath of elastomeric material ensuring fluid-tightness between this spring and the two bearing surfaces against which it is applied.

7. Fluid-tight seal according to claim 1, wherein the first member is the inner ring or cone of a conical roller bearing and the second member is the outer ring or cup of this bearing.

8. Fluid-tight seal according to claim 1 wherein said seal further comprises at least one eccentric stop affixed to one of the two elements and cooperating with a complementary bearing surface of the other of the two elements to prevent relative rotation of these two elements.

* * * * *